(12) United States Patent
Suzuki et al.

(10) Patent No.: US 7,316,617 B2
(45) Date of Patent: Jan. 8, 2008

(54) GAME SYSTEM AND STORAGE MEDIUM HAVING STORED THEREON GAME PROGRAM

(75) Inventors: Toshiaki Suzuki, Kyoto (JP); Kouichi Kawamoto, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 637 days.

(21) Appl. No.: 10/651,043

(22) Filed: Aug. 29, 2003

(65) Prior Publication Data

US 2004/0224756 A1 Nov. 11, 2004

(30) Foreign Application Priority Data

May 9, 2003 (JP) .............................. 2003-132054

(51) Int. Cl.
*A63F 9/24* (2006.01)

(52) U.S. Cl. .............................. 463/31; 463/30; 463/32; 463/33; 463/34

(58) Field of Classification Search ............. 463/30–34
See application file for complete search history.

(56) References Cited

U.S. PATENT DOCUMENTS 5,405,151 A * 4/1995 Naka et al. ................... 463/31
5,411,270 A * 5/1995 Naka et al. ................... 463/33
5,779,548 A * 7/1998 Asai et al. .................... 463/31

OTHER PUBLICATIONS

Nintendo Official Guidebook, "Nintendo All Stars! Super Smash Brothers", Shogakukan Inc., pp. 4-6 and 112, Mar. 20, 1999.

* cited by examiner

*Primary Examiner*—Ronald Laneau
*Assistant Examiner*—Travis Banta
(74) *Attorney, Agent, or Firm*—Nixon & Vanderhye, PC

(57) ABSTRACT

A first game image of a displayed region of a game space which contains all player characters is created, and a second image is created by zooming in, when a player has performed a specific operation on an operation means, on a surrounding region of a player character controlled by the player. When the specific operation of the operation means has not been performed by any player, the first image is output as a game image, and when the specific operation of the operation means has been performed, the second image is superimposed on the first image as an output game image.

10 Claims, 16 Drawing Sheets

F I G. 4
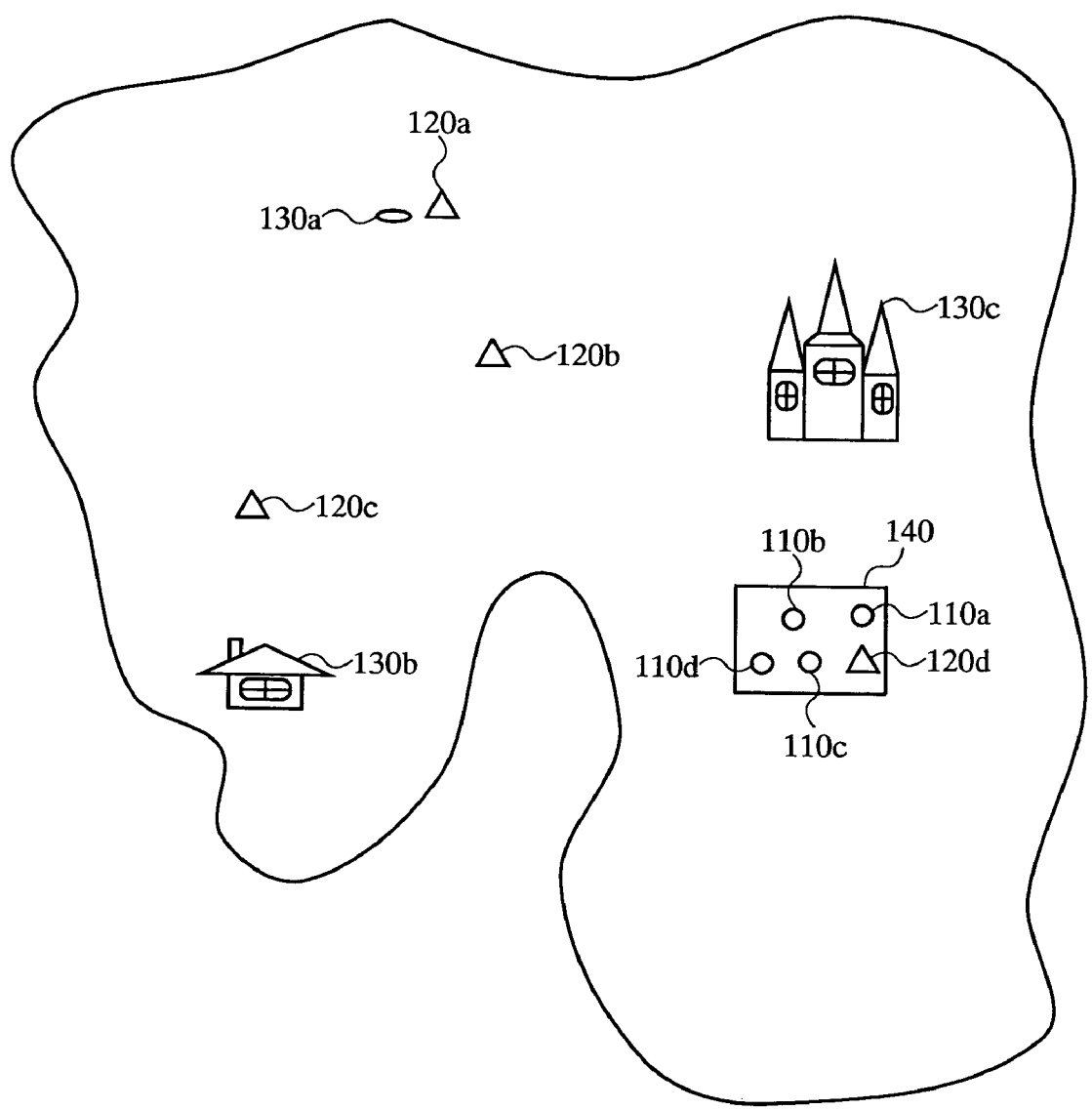

F I G. 1 2
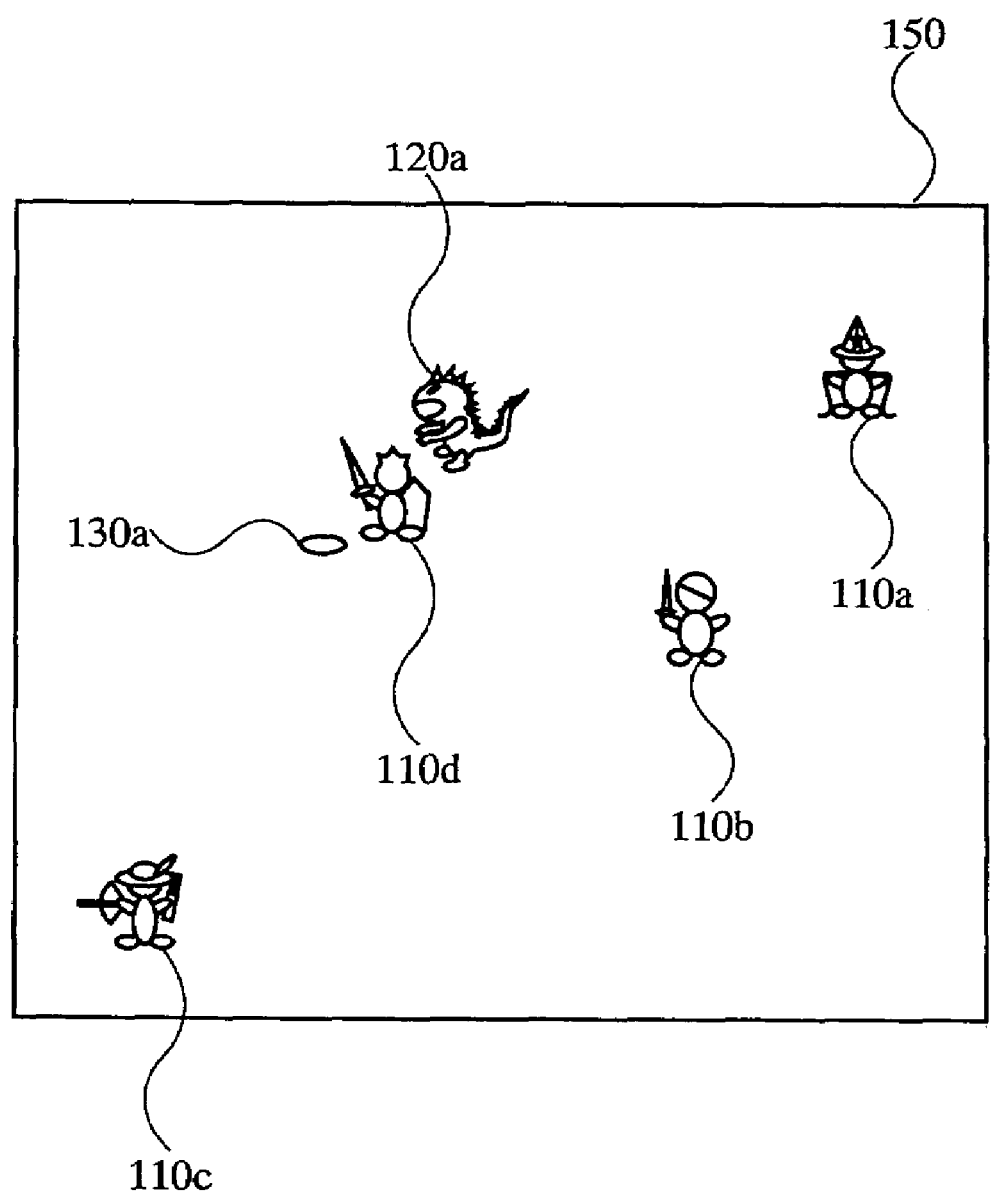

GAME SYSTEM AND STORAGE MEDIUM HAVING STORED THEREON GAME PROGRAM

BACKGROUND AND SUMMARY OF THE INVENTION

1. Field of the Invention

The illustrative embodiments relate to a game system and a storage medium having stored thereon a game program. More particularly, the illustrative embodiments relate to a game system in which a plurality of player characters, controlled by a plurality of players, respectively, move around in a game space, and a game image, containing all the player characters, is displayed, and to a storage medium having stored thereon a game program.

2. Description of the Background Art

Conventionally, game systems are available, in which the game proceeds with a plurality of characters moving around in a game space. In some of such game systems, a game image, which contains all the player characters, is displayed on a display means, such as a TV monitor. A description is given, for example, in "Nintendo Official Guidebook, Nintendo All Stars! Super Smash Brothers," Shogakukan Inc., Mar. 20, 1999 (hereinafter referred to as a conventional technique). In the aforementioned conventional technique, when the distances between a plurality of player characters are increased, the camera is zoomed out, for example, so that all the player characters can be displayed on a TV monitor or the like at the same time.

According to the display method of the aforementioned conventional technique, when the distances between a plurality of player characters are increased and the player characters are scattered around in the game space, the virtual camera performs a zoom-out process so that all the player character scan be displayed on a TV monitor or the like. In this case, game object images (e.g., images of the player characters and other objects) become relatively small, which may cause the players to experience difficulty in viewing the player characters and other objects.

Therefore, a feature of the illustrative embodiments is to provide a game system in which a plurality of players control a plurality of characters, respectively, for displaying a game image which contains all the player characters, and overcoming a situation in which the players experience difficulty in viewing images of game objects, such as images of the player characters. Another feature of the illustrative embodiments is to provide a storage medium having stored thereon a game program.

The illustrative embodiments have the following aspects to attain the features mentioned above. It is to be understood that reference numerals, etc. in parentheses are provided, for the purpose of helping to understand the present invention, to show the corresponding relationship with an embodiment, as will be described later, and thus are not intended to limit the scope of the present invention.

A first aspect of the illustrative embodiments is directed to a game system (a game system 1) wherein a plurality of player characters (player characters 110a to 110d), controlled by a plurality of players, respectively, move around in a virtual game space. The game system comprises: a plurality of operation means (controllers 6a to 6d); movement control means (a CPU 31 that performs S5; in cases where the CPU 31 performs processing, simply only the step number will be provided hereinbelow); first-image creation means (S15 and S17); second-image creation means (S21 and S23); and game image output means (S25). The plurality of operation means are operated by the plurality of players, respectively. The movement control means controls movement of the player characters in the game space according to a first operation of the operation means (an operation of a cross key 67). The first-image creation means creates a first image (a first image 150 in FIG. 12) of a displayed region (a displayed region 140 in FIG. 5) of the game space which contains all of the player characters. The second-image creation means creates a second image (a second image 180 in FIG. 15) by zooming in on a surrounding region of a first player character (a cut-out region 160 in FIG. 13) in the game space, when a second operation of the operation means (an operation of an A button 62) has been performed by one of the players, the first player character being one of the player characters controlled by the one player. The game image output means outputs the first image as a game image, when the second operation of the operation means has not been performed by any of the players, or superimposes the second image on the first image and outputs as a game image, when the second operation of the operation means has been performed by any one of the players.

With the above-described game system, when a player performs a second operation, not only is a first image constantly displayed, but a second image is also appropriately superimposed on the first image and displayed, in which the surrounding area of a player character controlled by the player is zoomed in. Therefore, it is possible to rectify a situation in which the players experience difficulty in viewing images of, for example, the player characters, by displaying a game image containing all of the player characters in the first image, and displaying the second image if necessary. In addition, because the region surrounding the player character is displayed zoomed in, not only is an image of the player character displayed zoomed in, but also an image of the area surrounding the player character is displayed zoomed in, which enables the player to clearly see the circumstances surrounding the player character thereof; that is, the player can see the detailed circumstances, for example, if an item is dropped nearby or if an enemy character is around. Furthermore, because the first image is a game image that contains all the player characters, other players can also closely watch the first image during the game. In addition, because the second image is superimposed on the first image, the second image, which is a zoomed-in image of the area surrounding the player character, is also shown to other players. Therefore, when a player performs the second operation, the player can inform other players of the circumstances surrounding the player character thereof; for example, if a player finds an important item for other players, which is dropped near the player character thereof, the player can clearly inform the other players of such circumstances.

The above-described first-image creation means may create the first image in a manner such that a size of the displayed region is varied based on a scattering of the player characters moved by the movement control means and an image of the displayed region is zoomed in or out in accordance with the size of the displayed region. In this case, when the distances between the player characters are increased and the player characters are scattered around in the game space due to movement of the player characters, a zoom-out process is performed; therefore, even if images of the player characters, etc. become small on the game screen, it becomes possible for the player to see the image of the player character and the surrounding circumstances of the player character when a player performs the second operation.

Moreover, the above-described game image output means may superimpose the second image on the first image, in accordance with a location of the first player character in the first image (a location 200 in FIG. 16). The second image is displayed superimposed on the first image, in accordance with the display location of the player character in the first image which is constantly displayed; that is, the display location of the second image indicates the display location of the player character in the first image, and therefore the location of the player character is clearly indicated. In addition, the second image is superimposed at the display location of the player character in the first image; in other words, a zoomed-in image of the player character is displayed at the location where the player character is originally displayed, preventing awkwardness in the game play. Further, when the second image is superimposed on the first image, a part of the first image cannot be displayed; however, the part of the first image which cannot be displayed because of the second image being superimposed, is complemented by the second image itself, and therefore it is possible to minimize reduction of information provided to the player. Moreover, when, for example, a player has lost sight of the player character thereof, the player can clearly identify the location where the player character thereof is present, and it also becomes possible to show other players the location where the player character of the player is present.

The surrounding region which is displayed in the second image may be a region having the first player character in a center and may be a predetermined size region in the game space. In this case, the circumstances surrounding the player character are displayed in the second image, the area of which has a predetermined size in the game space, and thus the player can always obtain a certain amount of information.

The second image may be displayed on a display means in a predetermined size, the display means displaying a game image output by the game image output means. In this case, because the second image is displayed on a display means in a predetermined size, the first image is not excessively hidden by the second image. In addition, it is possible to display an image without awkwardness.

The above-described second-image creation means may create the second image by cutting out and zooming in on a portion of the first image created by the first-image creation means. Since the first image is utilized when creating the second image, efficient processing is achieved.

A second aspect of the illustrative embodiments is directed to a storage medium having stored thereon a game program to be executed by a game system, the storage medium being readable by the game system comprising a plurality of operation means operated by a plurality of players, respectively, wherein a plurality of player characters move around in a virtual game space, controlled by the plurality of players, respectively. The game program provides functions to the game system, the functions comprising movement control means, first-image creation means, second-image creation means, and game image output means. The movement control means controls movement of the player characters in the game space according to a first operation of the operation means. The first-image creation means creates a first image of a displayed region of the game space which contains all of the player characters. The second-image creation means creates a second image by zooming in on a surrounding region of a first player character in the game space, when a second operation of the operation means has been performed by one of the players, the first player character being one of the player characters controlled by the one player. The game image output means outputs the first image as a game image, when the second operation of the operation means has not been performed by any of the players, or superimposes, when the second operation of the operation means has been performed by any one of the players, the second image on the first image as an output game image.

According to the above-described storage medium, even if a storage medium has stored thereon a game program which is executed by a game system and is readable by the game system, the same advantageous effects as those achieved by the above-described game system of the illustrative embodiments can be achieved.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 is an illustration showing a state in which the location of a displayed region is changed with movement of player characters;

FIG. 12 is an exemplary illustration showing a game image (a first image 150) which is created, at step S17 in FIG. 10, in the state shown in FIG. 11;

DESCRIPTION OF THE PREFERRED EMBODIMENTS

Figure 1:
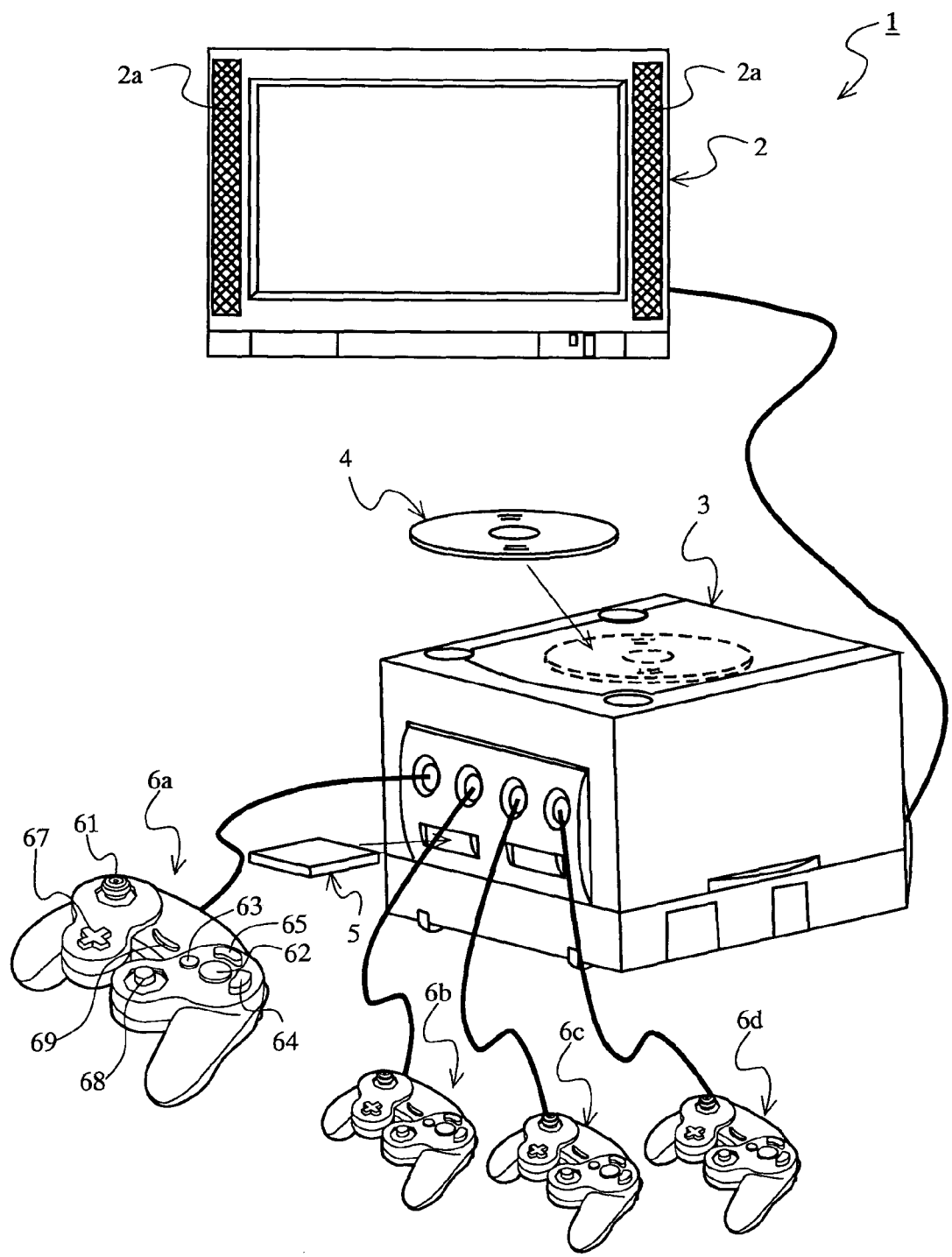
FIG. 1 is an external view illustrating a game system 1 according to an embodiment of the present invention.

With reference to FIG. 1, a game system 1 according to an embodiment of the present invention is described. FIG. 1 is an external view illustrating the game system. An embodiment of the present invention is described below, using a stationary game machine as an example.

In FIG. 1, the game system 1 includes a CRT (Cathode Ray Tube) display (hereinafter referred to as a TV monitor) 2 provided with speakers 2a, such as a television receiver, and a stationary game machine (hereinafter simply referred to as a game machine) 3. The game machine 3 is connected to the TV monitor 2 with a connection cord. The game machine 3 includes a controller 6, which is connected to the game system 3 with a connection cord, and an optical disk 4, an example of an information storage medium, which is removably attached to and detached from the game machine 3 and is selectively used. As many controllers 6 are provided as there are players. In the present embodiment, the number of players is four, and thus, four controllers 6 are provided (6a to 6d). In addition, a memory card 5 for storing, for example, backup memory that securely stores save data, etc. is inserted at will into the game machine 3, if necessary. The game machine 3 executes a game program stored on the optical disk 4, and thereby displays on the TV monitor 2 the results as a game image. The game machine 3 is also capable of reproducing, by using save data stored in the memory card 5, the state of the game performed in the past and displaying a game image on the TV monitor 2. The players can enjoy the process of the game by operating the controllers 6, as watching a game image displayed on the TV monitor 2. It is to be noted that in the present embodiment, the optical disk 4 is described as a storage medium for storing a game program, but the present invention is not limited thereto; a game program may be provided to the game machine 3 through any other computer-readable storage media, such as a memory card. In addition, a game program may be provided to the game machine 3 through transmission media, such as Internet and a communication cable. Furthermore, a game program may be pre-stored on storage means of the game machine 3.

The controller 6 is connected to the game machine 3 with a connection cord, as is described above, and the connection cord is plugged in and out of the game machine 3 at will. The controller 6 is an operation means which mainly controls a player object which is displayed on the TV monitor 2 and which appears in a game space (which is typically a game's main character, a player's control object), and has an input portion including a plurality of operation buttons, a key, sticks, and the like. Specifically, the controller 6 has grip portions that are gripped by a player. The controller 6 includes a main stick 61 and a cross key 67 which can be operated, for example, with the thumb of the player's left hand, and a C stick 68, an A button 62, a B button 63, an X button 64, a Y button 65, and a start-pause button 69 which can be operated, for example, with the thumb of the right hand. Operations with the use of the input portion of the controller 6 are performed in accordance with the progress of the game; however, since such operations do not directly relate to the illustrative embodiments, a detailed description thereof is omitted.

Figure 2:
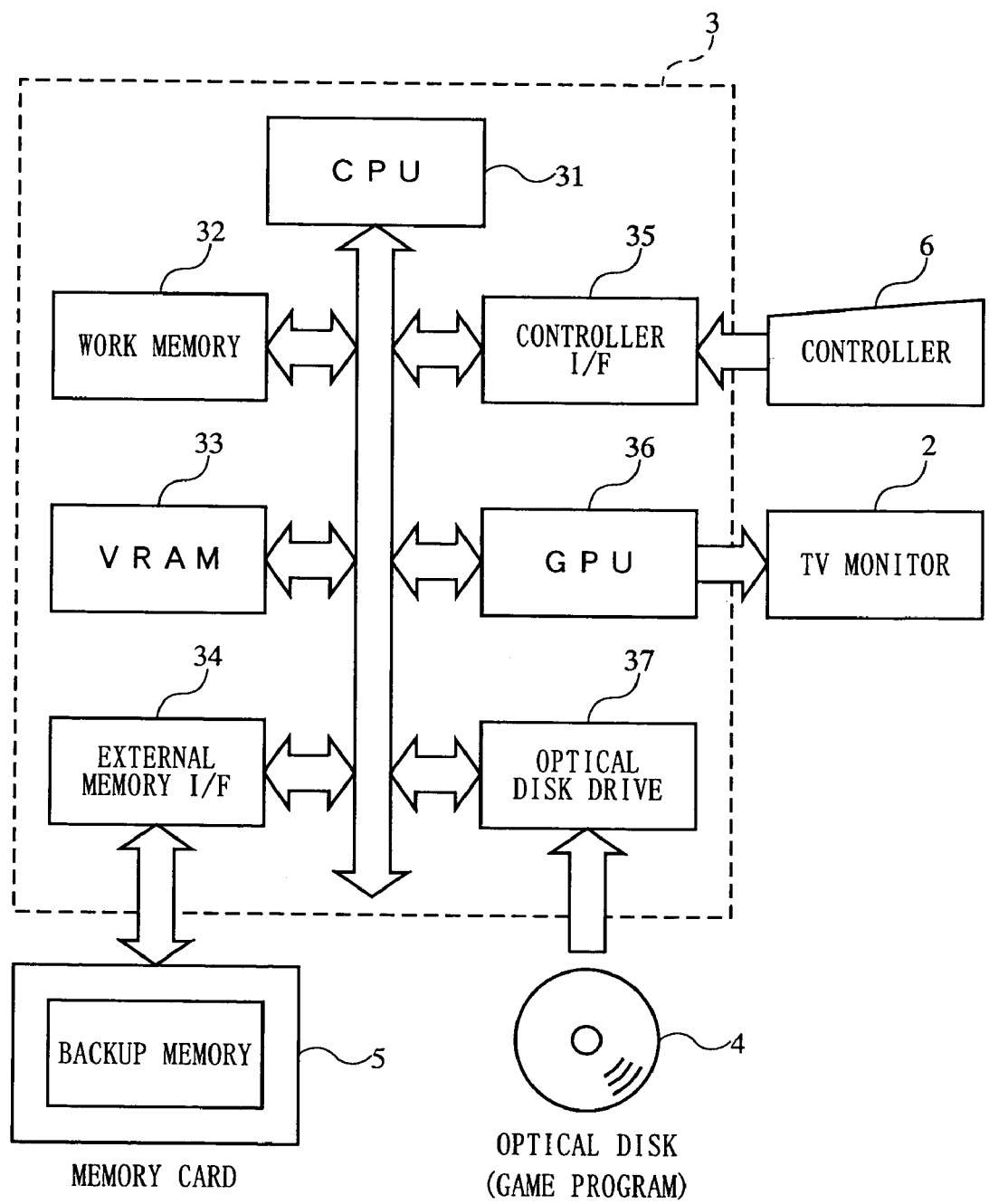
FIG. 2 is a functional block diagram of a game machine 3 in FIG. 1.

Next, with reference to FIG. 2, the configuration of the game machine 3 is described. FIG. 2 is a functional block diagram of the game machine 3.

In FIG. 2, the game machine 3 includes a 128-bit (for example) CPU (Central Processing Unit) 31, which executes various programs. The CPU 31 executes the start program stored in a boot ROM, which is not shown in the figure, and performs, for example, initialization of a memory, such as a work memory 32, and then executes a game program stored on the optical disk 4 and performs game processing according to the game program. The work memory 32, a video RAM (VRAM) 33, an external memory interface (I/F) 34, a controller I/F 35, a GPU (Graphics Processing Unit) 36, and an optical disk drive 37 are connected to the CPU 31 via a given bus.

The work memory 32 is a storage region used in the CPU 31, and appropriately stores a game program, etc., which are required for the processing of the CPU 31. For example, the work memory 32 stores a game program, various data, and the like that are read from the optical disk 4 by the CPU 31. In addition, temporary data is also stored in the work memory 32, which is created by the CPU 31 executing the game program. The CPU 31 performs game processing, using the game program, various data, and the like, stored in the work memory 32. The VRAM 33 stores game image data to be displayed on the TV monitor 2. The external memory I/F 34 connects between the game machine 3 and the memory card 5 to provide communication therebetween, by joining the memory card 5 to a connector, which is not shown in the figure. The CPU 31 accesses the backup memory provided in the memory card 5 via the external memory I/F 34. The controller I/F 35 connects between the controllers 6, respectively connected to a plurality of connectors (not shown), and the game machine 3, to provide communication therebetween. For example, the controllers 6 are respectively joined to the above-described connectors with connection cords, and are connected to the game machine 3 via the controller I/F 35. The GPU 36 includes, for example, a semiconductor chip for performing calculations required for 3D graphics display, and processes game image data, which is processed by the CPU 31, and game image data stored in the VRAM 33, and then displays a game image on the TV monitor 2. The optical disk drive 37 reads data, which is located at a given read location and stored on the optical disk 4, and outputs the data to the bus of the game machine 3.

Figure 3:
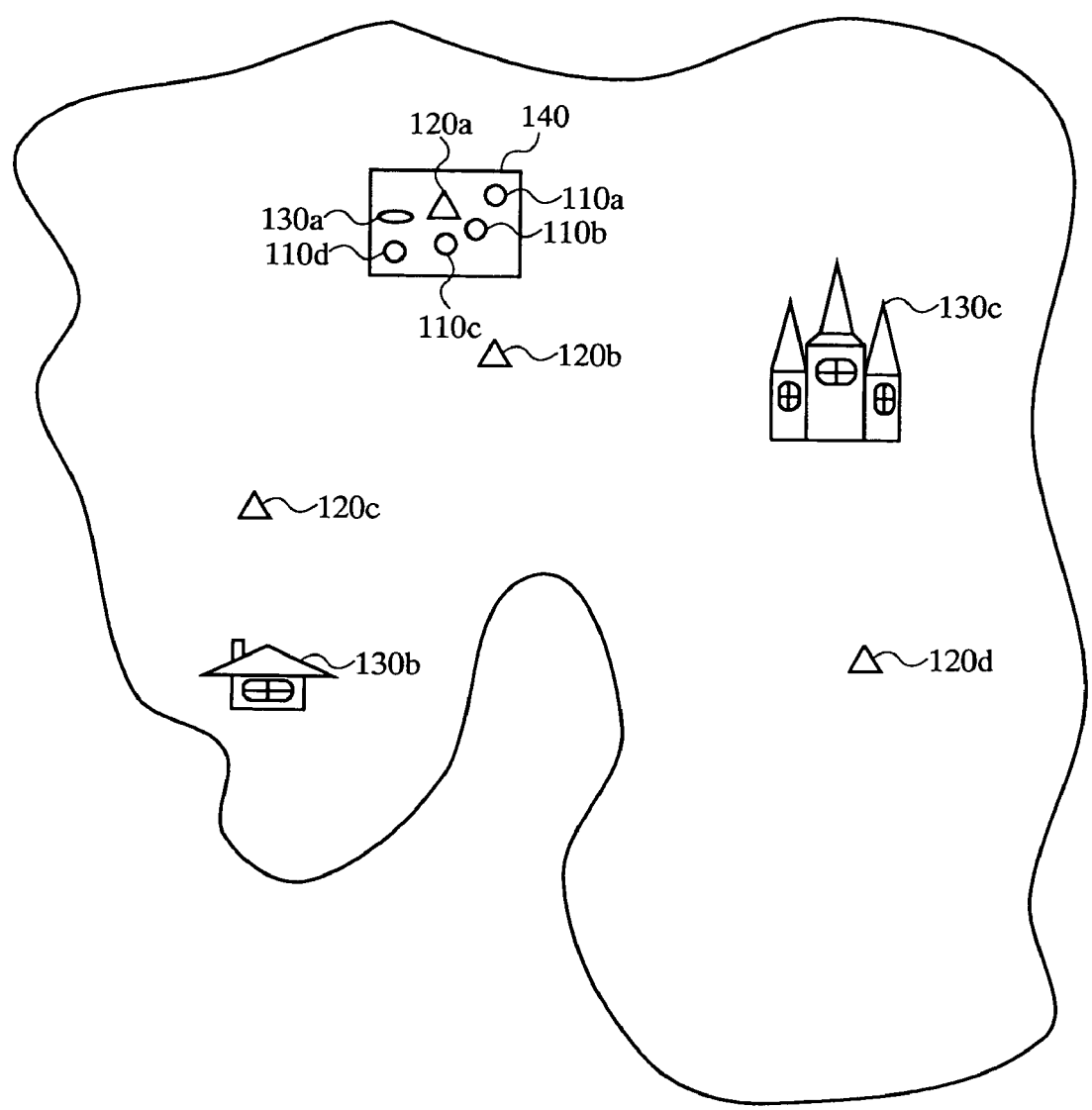
FIG. 3 is an illustration showing a game space and objects present in the game space.

The outline of a game to be performed on such a game system as that described above, is provided in FIGS. 3 to 9. FIG. 3 is an illustration showing the entire game space (game map) where, in this game, player characters can move around. On the game map, there are player characters 110a to 110d, enemy characters 120a to 120d, a cave entrance 130a, a house object 130b, and a castle object 130c. The player characters 110a to 110d are hereinafter collectively referred to as player characters 110, the enemy characters 120a to 120d are hereinafter collectively referred to as enemy characters 120, and the cave entrance 130a, the house object 130b, and the castle object 130c are hereinafter collectively referred to as house and castle objects 130. The player characters 110 and the enemy characters 120 are objects that can move around on the game map, and the house and castle objects 130, which include the cave entrance, house, castle, etc., are objects that are located at stationary given points on the game map. The game of the present embodiment is a game in which a plurality of players (four players in the present embodiment) enjoy defeating the enemy characters 120 and winning items (not shown in the figure), by moving their respective player characters 110a to 110d on the game map by operating their respective controllers 6a to 6d. In FIG. 3, for simplicity, the images of the player characters 110 are depicted as circles "○" and the images of the enemy characters 120 are depicted as triangles "Δ".

A game map and game objects, such as player characters, which are contained in a displayed region 140, are displayed on the TV monitor 2 as shown in FIG. 3. The displayed region 140 is set to contain all the player characters 110*a* to 110*d*, and therefore all the player characters 110*a* to 110*d* are displayed on the TV monitor 2.

When the player characters 110 move, the displayed region 140 is adjusted so that all the moved player characters 110*a* to 110*d* can be displayed on the TV monitor 2. FIG. 4 is an illustration showing a state in which the displayed region 140 moves according to the movement of the player characters 110. It can be seen, by comparing this state with that in FIG. 3, that the player characters 110*a* to 110*d* have moved in the lower right direction, and accordingly, the displayed region 140 has also moved in the lower right direction.

Figure 5:
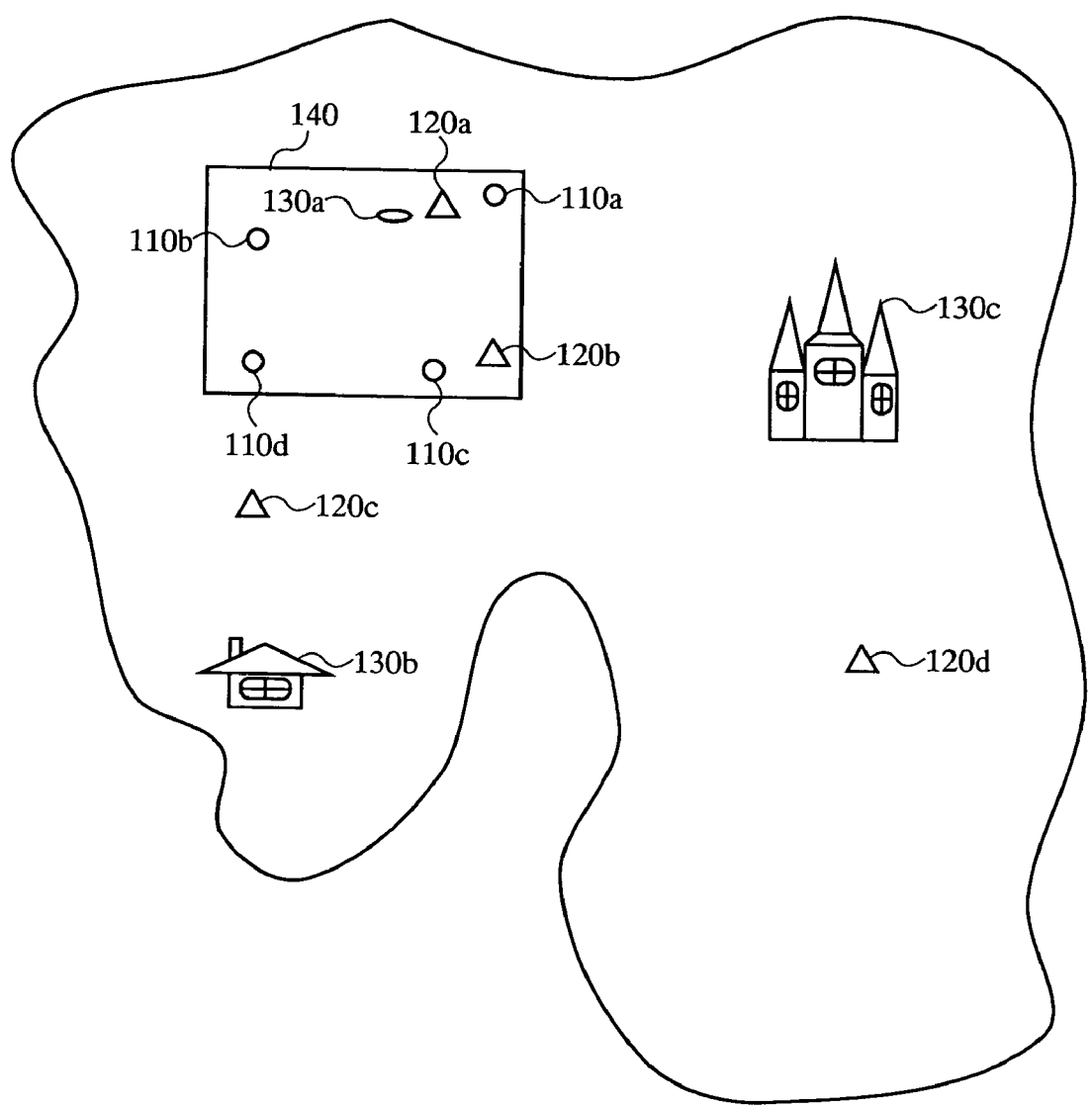
FIG. 5 is an illustration showing a state in which the size of the displayed region is changed as the distances between the player characters increase.

FIG. 5 is an illustration showing a state in which the size of the displayed region 140 increases as the distances between the player characters 110 increase. It can be seen, by comparing this state with that in FIG. 3, that because the player characters 110*b*, 110*c*, and 110*d* have moved in the upper left, lower right, and lower left directions, respectively, the distances between the player characters 110 are increased, resulting in an increase in the size of the displayed region 140. On the other hand, in cases where the distances between the player characters 110 are reduced, the size of the displayed region 140 is reduced. By thus setting the displayed region 140, all the player characters 110*a* to 110*d* can always be displayed on the TV monitor 2.

In cases where the size of the displayed region 140 is increased, a game image of the displayed region 140 is zoomed out and output to the TV monitor 2. On the other hand, in cases where the size of the displayed region 140 is reduced, a game image of the displayed region 140 is zoomed in and output to the TV monitor 2. A game image of a predetermined size is displayed on the TV monitor 2 by this zoom process, regardless of the size of the displayed region 140. In addition, the display size of the player characters 110, enemy characters 120, house and castle objects 130, etc. on the TV monitor 2 increases or reduces by the zoom process.

Figure 6:
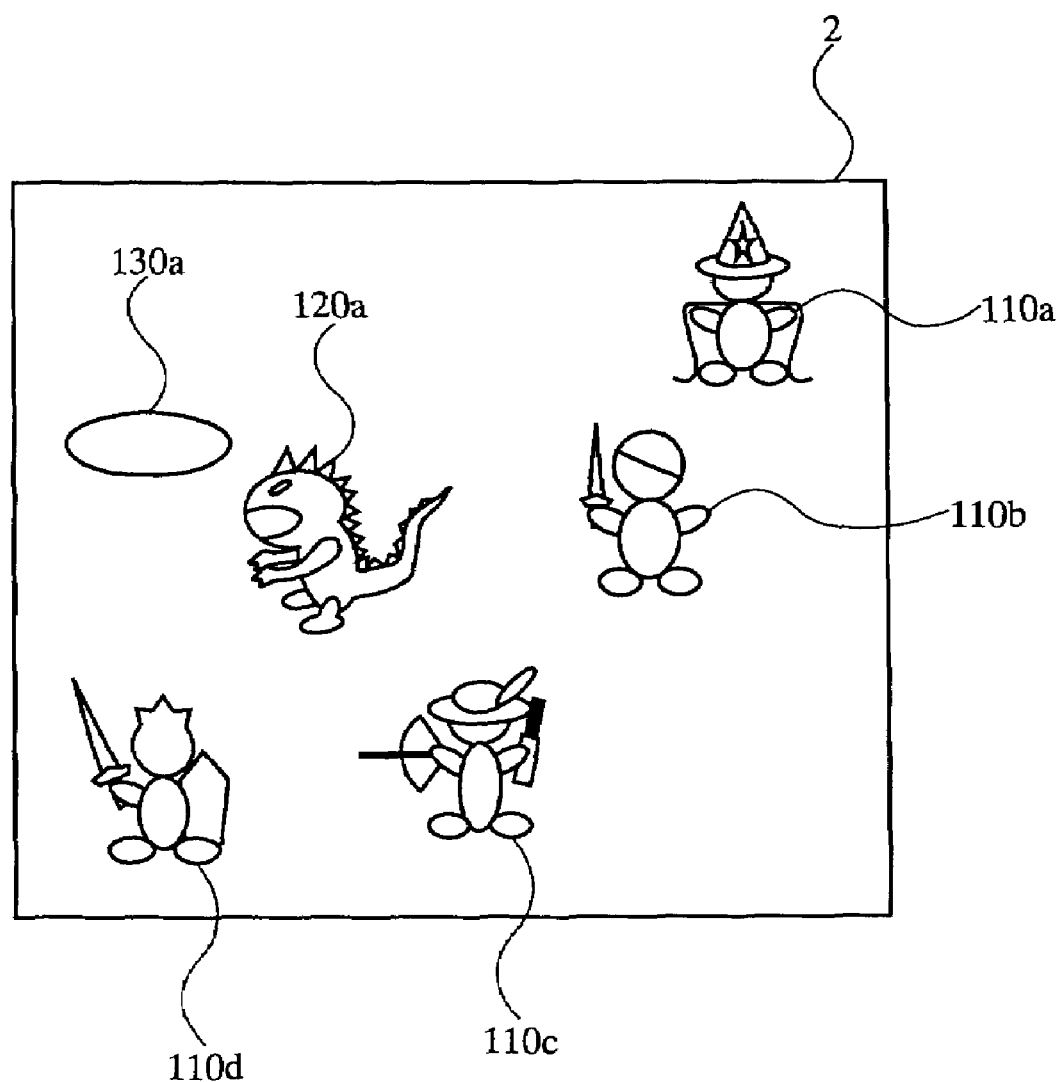
FIG. 6 is an exemplary illustration showing a game image displayed on a TV monitor 2 for the case where the distances between the player characters are close.
Figure 7:
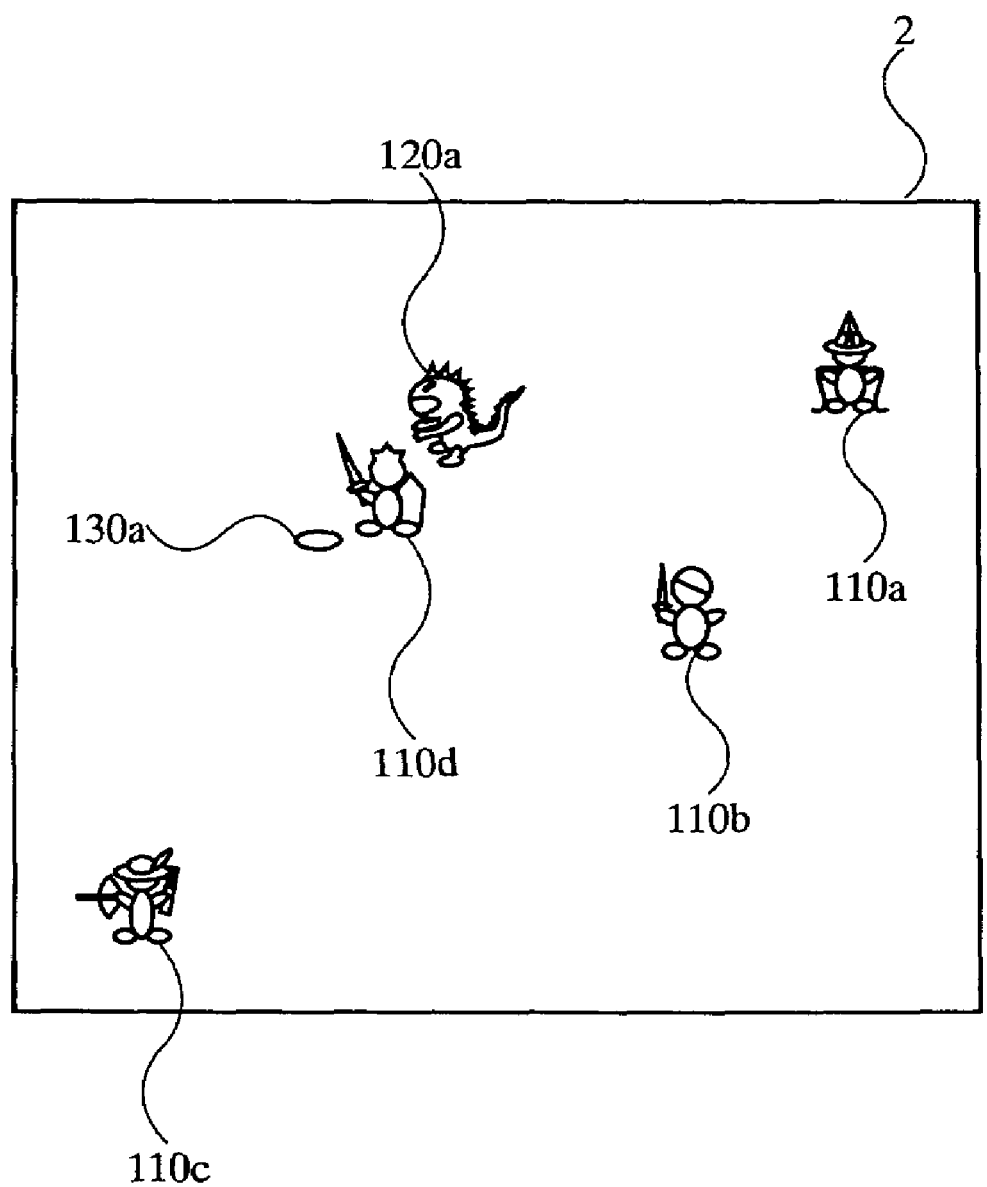
FIG. 7 is an exemplary illustration showing a game image displayed on the TV monitor 2 for the case where the distances between the player characters are far.

FIGS. 6 and 7 are illustrations for showing the difference in appearance between two game images, which are displayed on the TV monitor 2 according to different sizes of the displayed region 140. FIG. 6 is an exemplary illustration showing a game image displayed on the TV monitor 2 when the distances between the player characters 110 are close and the size of the displayed region 140 is thus small. In this case, because a game image of the displayed region 140 is zoomed in and displayed, the images of the player characters 110*a* to 110*d*, enemy character 120*a*, cave entrance 130*a*, and other game map images which are contained in the displayed region 140, are displayed in a comparatively large size on the TV monitor 2. Meanwhile, FIG. 7 is an exemplary illustration showing a game image displayed on the TV monitor 2 when the distances between the player characters 110 are farther than that shown in FIG. 6 and the size of the displayed region 140 is thus large. In this case, because a game image of the displayed region 140 is zoomed out and displayed, the images of the player characters 110*a* to 110*d*, enemy character 120*a*, cave entrance 130*a*, and other game map images, which are contained in the displayed region 140, are displayed in a comparatively small size on the TV monitor 2.

Figure 8:
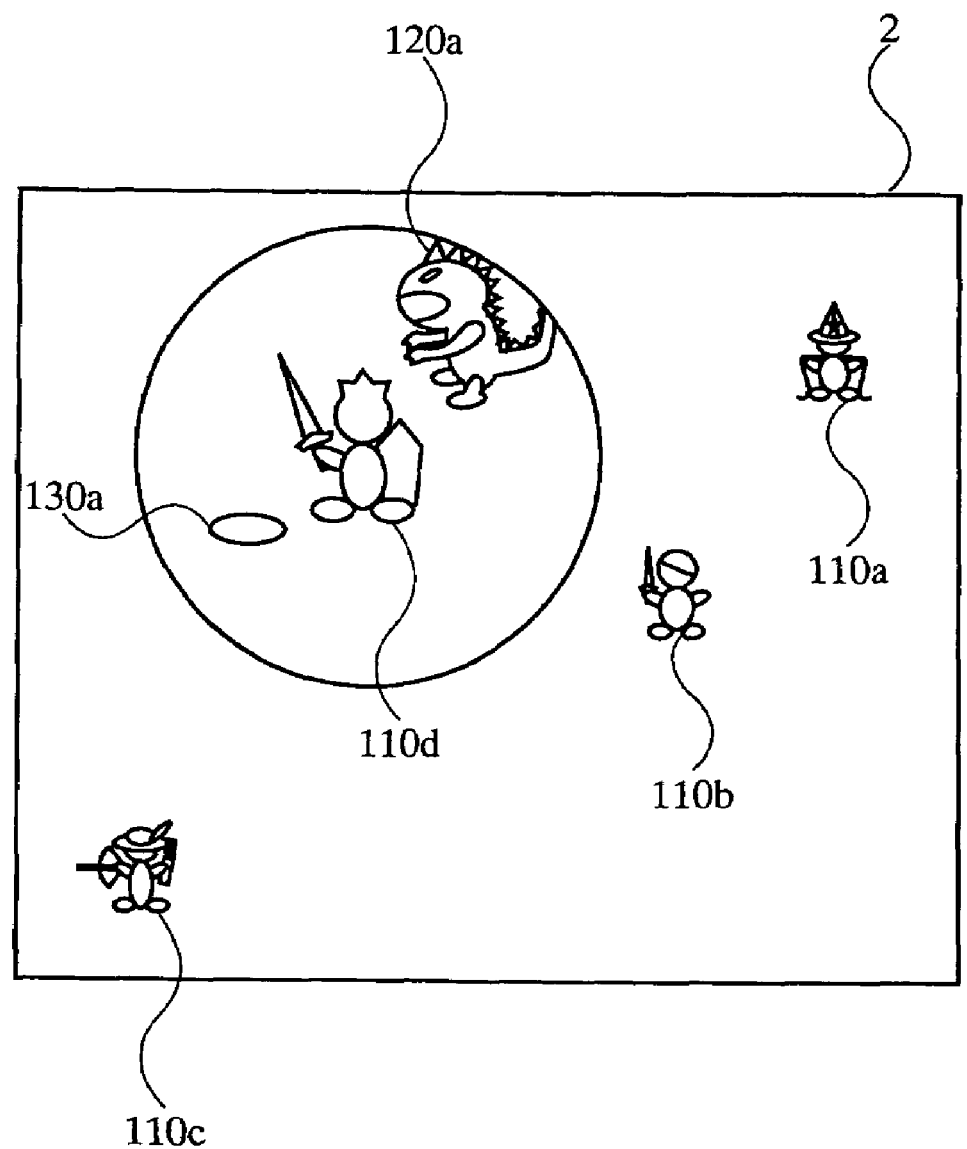
FIG. 8 is an exemplary illustration showing a game image displayed on the TV monitor 2 when a player operates an A button 62.

FIG. 8 is an exemplary illustration showing a game image displayed on the TV monitor 2 at times when a player, who controls the player character 110*d*, operates, in the state shown in FIG. 7, the operation switch 62 (the A button) of the controller 6*d*. In this case, a zoomed-in image (hereinafter referred to as the "second image") of the surrounding area of the player character 110*d* is superimposed on the image shown in FIG. 7 (hereinafter referred to as the "first image") and displayed. Here, the image (second image) created by zooming in on a given area of the first image with the location of the player character 110*d* in the first image (shown in FIG. 7) as the center, is super imposed at the location of the player character 110*d* and displayed.

Figure 9:
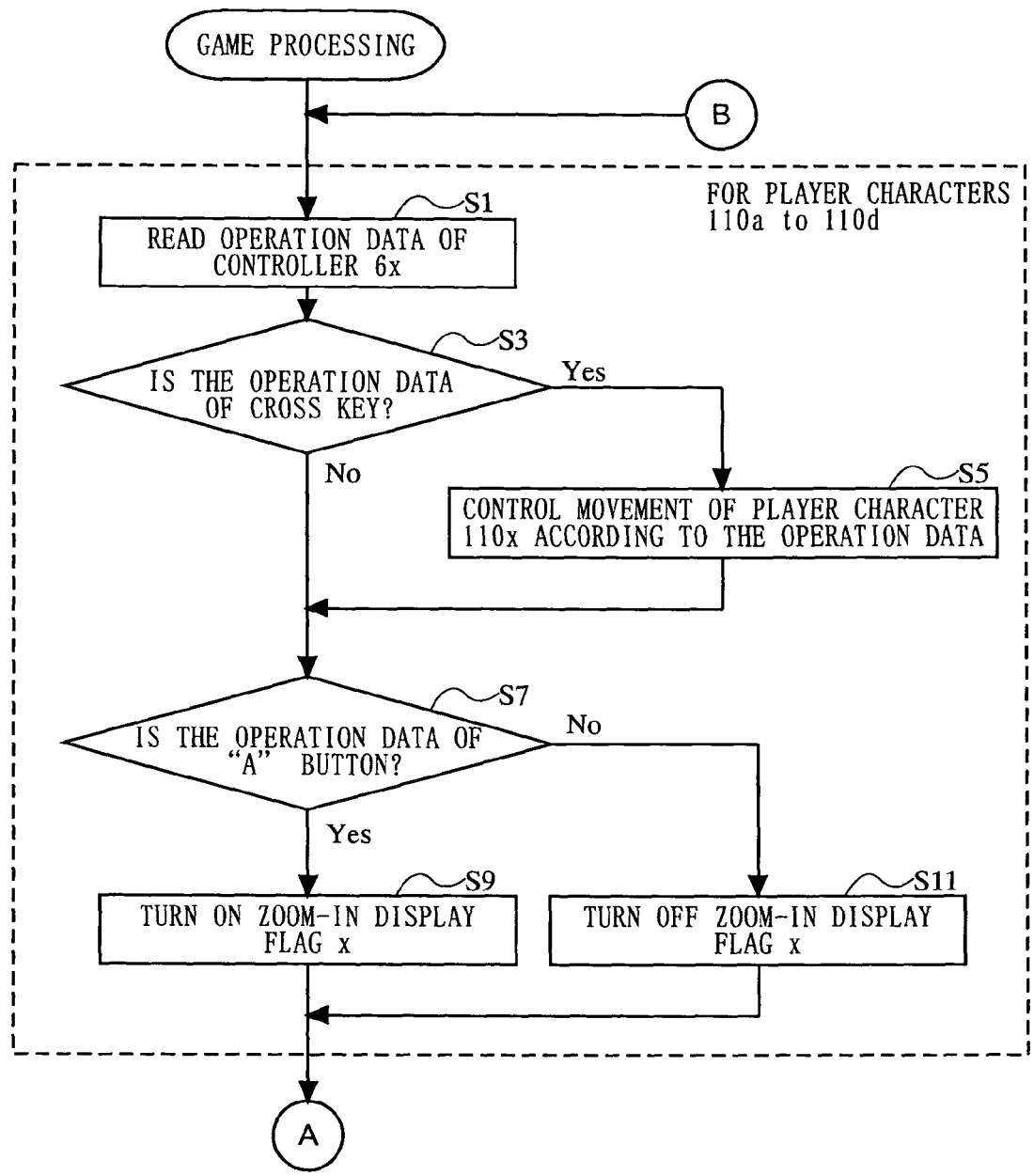
FIG. 9 is a flowchart illustrating the first half of game processing executed by a CPU 31 of the game machine 3.
Figure 10:
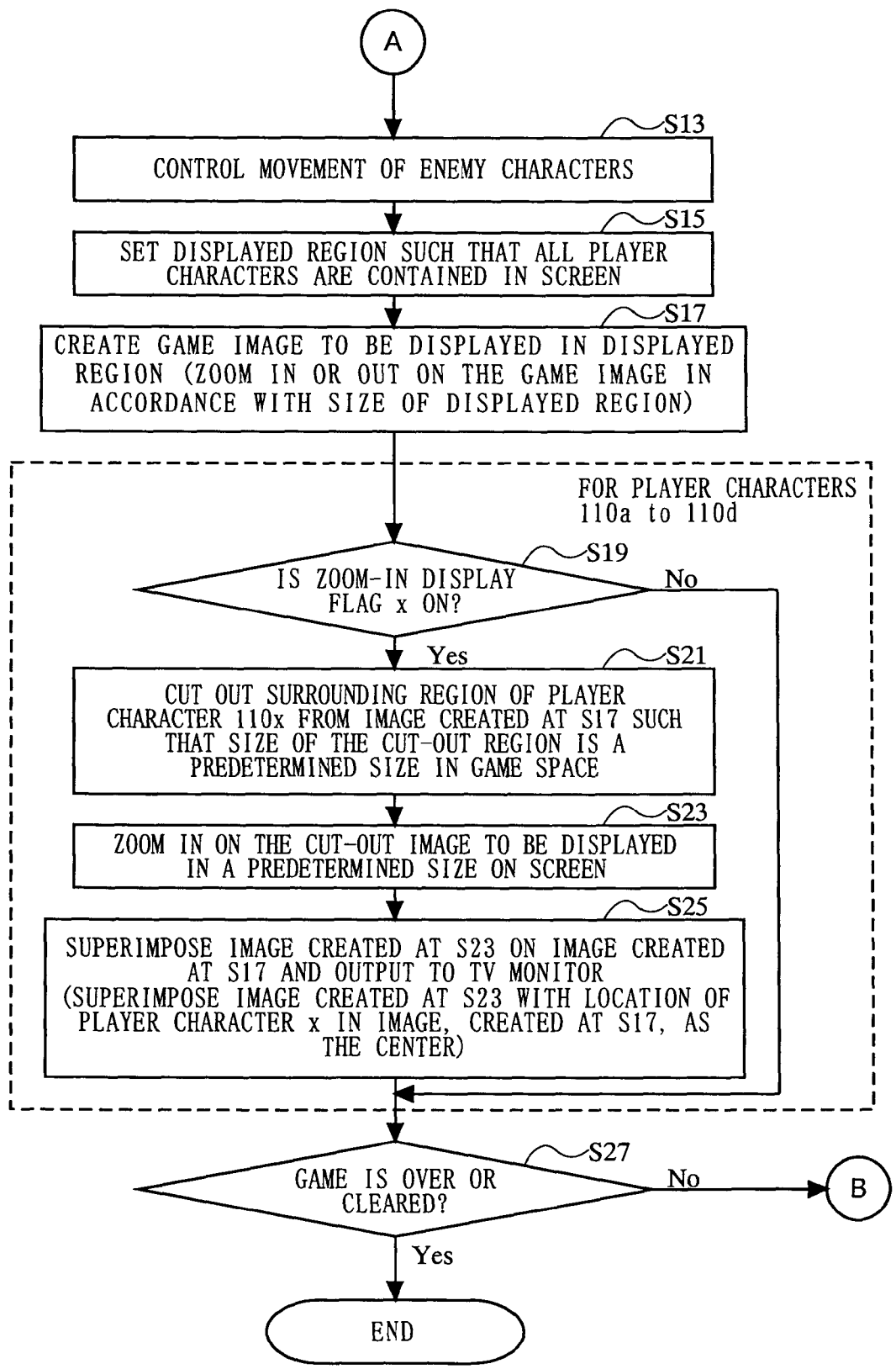
FIG. 10 is a flowchart illustrating the second half of the game processing executed by the CPU 31 of the game machine 3.

FIGS. 9 and 10 are flowcharts showing game processing performed by the CPU 31 of the game machine 3. When the game machine 3 is turned on, the CPU 31 of the game machine 3 executes the start program stored in a boot ROM, which is not shown in the figures, whereby each unit, such as the work memory 32, is initialized. Subsequently, the game program and various data, which are stored on the optical disk 4, are read into the work memory 32 through the optical disk drive 37, thereby starting the execution of the game program, shown in FIGS. 9 and 10.

In FIG. 9, the CPU 31 performs initialization of game variables, etc. and then displays, for example, the initial screen of the game, and thereafter performs processing, starting with step S1. First, the processes of steps S1 to S11 are performed on each of the player characters 110. Specifically, the CPU 31 performs processing first on the player character 110*a* such that a variable x which represents one of the player characters 110 (hereinafter simply referred to as "x")=a, then on the player character 110*b* such that x=b, further on the player character 110*c* such that x=c, and finally on the player character 110*d* such that x=d.

The processes of steps S1 to S11 are specifically described, using the player character 110*a* as an exemplary example. First, at step S1, the CPU 31 reads operation data of the controller 6*a*. Then, the CPU 31 at step S3 determines whether the read operation data is operation data of the cross key 67. If it is, processing advances to step S5 where the CPU 31 controls movement of the player character 110*a* according to the operation data. Specifically, the CPU 31 moves the player character 110*a* upward, downward, leftward, and rightward on the game map, when pressing the "up," "down," "left," and "right" on the cross key 67, respectively. If, at step S3, the data is not determined as operation data of the cross key 67, or upon completion of step S5, processing advances to step S7 where the CPU 31 determines whether the operation data read at step S1 is operation data of the A button 62. If it is, processing advances to step S9 where the CPU 31 turns on a zoom-in display flag "a" on the player character 110*a*. If not, processing advances to step S11 where the CPU 31 turns off the zoom-in display flag "a" on the player character 110*a*.

After the CPU 31 has performed the same processing as above on each of the player characters 110*b* to 110*d*, processing advances to step S13, shown in FIG. 10.

At step S13, the CPU 31 controls movement of enemy characters according to an algorithm defined by the program. Upon completion of step S13, the CPU 31 at step S15 sets the displayed region 140 of the game space to be displayed on the TV monitor 2. Specifically, the CPU 31 sets the upper end of the displayed region 140 at a location a little above the location of one of the player characters 110*a* to 110*d*, which is located uppermost on the game map (i.e., the player character 110*a*, which is located uppermost in the illustration of FIG. 3), sets the lower end of the displayed region 140 at a location a little below the location of a player character, which is located lowermost (i.e., the player character 110d in FIG. 3), sets the right end of the displayed region 140 at a location a little to the right of the location of a player character, which is located rightmost (i.e., the player character 110a in FIG. 3), and sets the left end of the displayed region 140 at a location a little to the left of the location of a player character, which is located leftmost (i.e., the player character 110d in FIG. 3). By thus setting the displayed region 140, an area of the game map, which contains all the player characters 110a to 110d, is set as the displayed region 140, and the location of the displayed region 140 changes according to movement of the player characters 110. In addition, the size of the displayed region 140 changes, based on the scattering of the player characters 110. It is to be noted that the displayed region 140 may be set to contain therein all player characters 110 which are alive during the course of the game (i.e., those of the player characters 110 which died due to attacks, etc. by the enemy characters 120, are not contained in the displayed region 140).

Upon completion of step S15, the CPU 31 at step S17 creates a game image (first image) of the displayed region 140. The created game image is stored in the work memory 32. The game image contains images of all the player characters 110a to 110d, images of the enemy characters 120, house and castle objects 130, etc., which are present in the displayed region 140, and a game map of the displayed region 140. In the process of step S17, the CPU 31 performs the above zoom process on the game image according to the size of the displayed region 140. Specifically, the CPU 31 zooms out on the game image when the displayed region 140 is large, and zooms in on the game image when the displayed region 140 is small. A game image of a predetermined size is created by such a zoom process.

Figure 11:
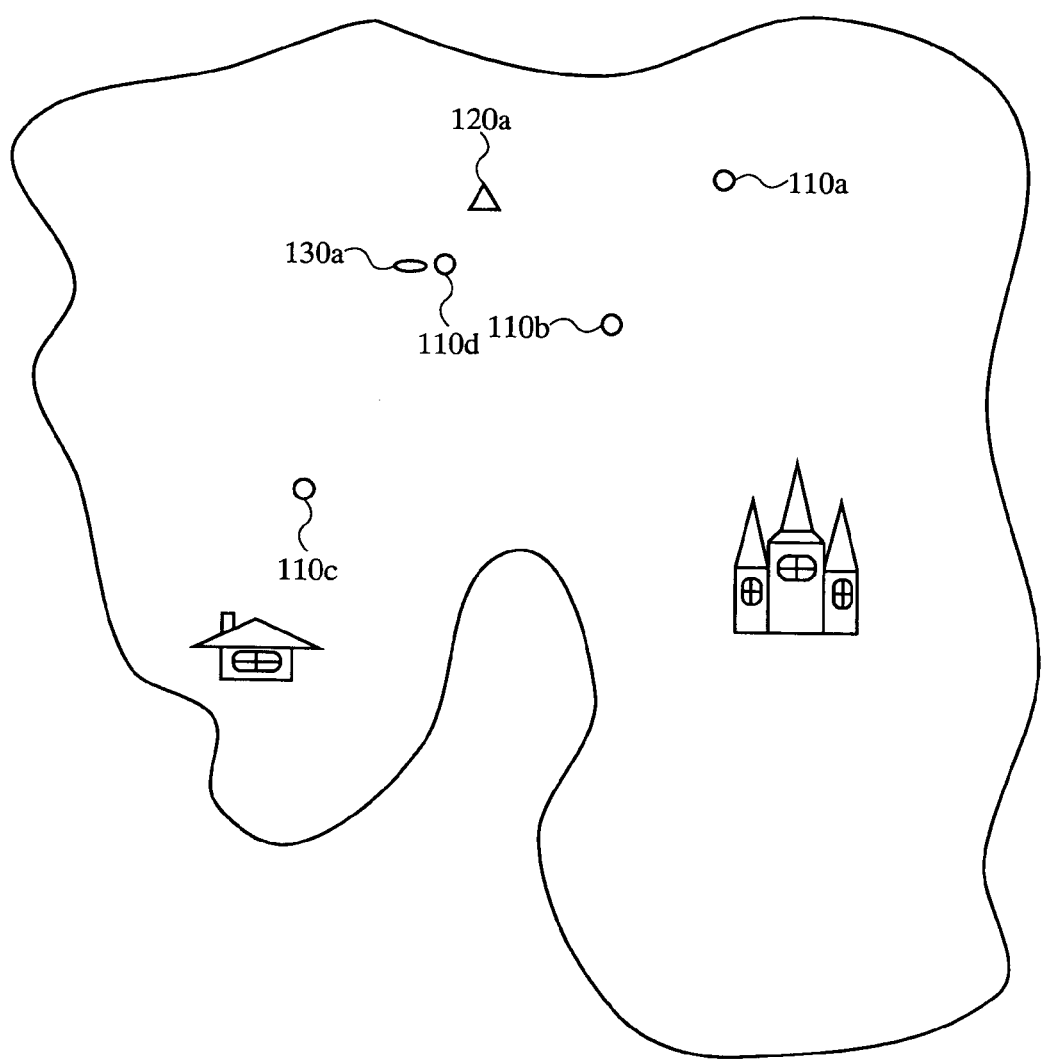
FIG. 11 is an illustration showing a state of the game at some point.

FIG. 11 is an illustration showing a state of the game at some point. In the game space, there are the player characters 110a to 110d, the enemy character 120a, the cave entrance 130a, etc. An exemplary illustration of a game image (first image) created, at the above step S17, in the state in FIG. 11 is shown in FIG. 12. FIG. 12 shows a first image 150 which contains the player characters 110a to 110d and which has been subjected to the zoom process according to the size of the displayed region 140, to have a predetermined size. This first image 150 is stored in the work memory 32.

Upon completion of step S17, the CPU 31 performs the processes of steps S19 to S25 on each of the player characters 110a to 110d. Specifically, the CPU 31 performs processing first on the player character 110a such that x=a, then on the player character 110b such that x=b, further on the player character 110c such that x=c, and finally on the player character 110d such that x=d.

The processes of steps S19 to S25 are specifically described, using the player character 110a as an exemplary example. First, at step S19, the CPU 31 determines whether the zoom-in display flag "a" on the player character 110a is ON or OFF. If it is OFF, the CPU 31 ends processing of the player character 110a. If it is ON, processing advances to step S21 where the CPU 31 cuts out the surrounding region of the player character 110a from the game image (first image), which was created and stored in the work memory 32 at step S17. In this cut-out process, the size of the cut-out region is determined to be a predetermined size in the game space. Because the first image is subjected to the zoom process according to the size of the displayed region 140, the size of the cut-out region is not a predetermined size in the first image. When the image was zoomed in at step S17, a comparatively large region is cut out from the first image, and when the image was zoomed out at step S17, a comparatively small region is cut out from the first image.

Figure 13:
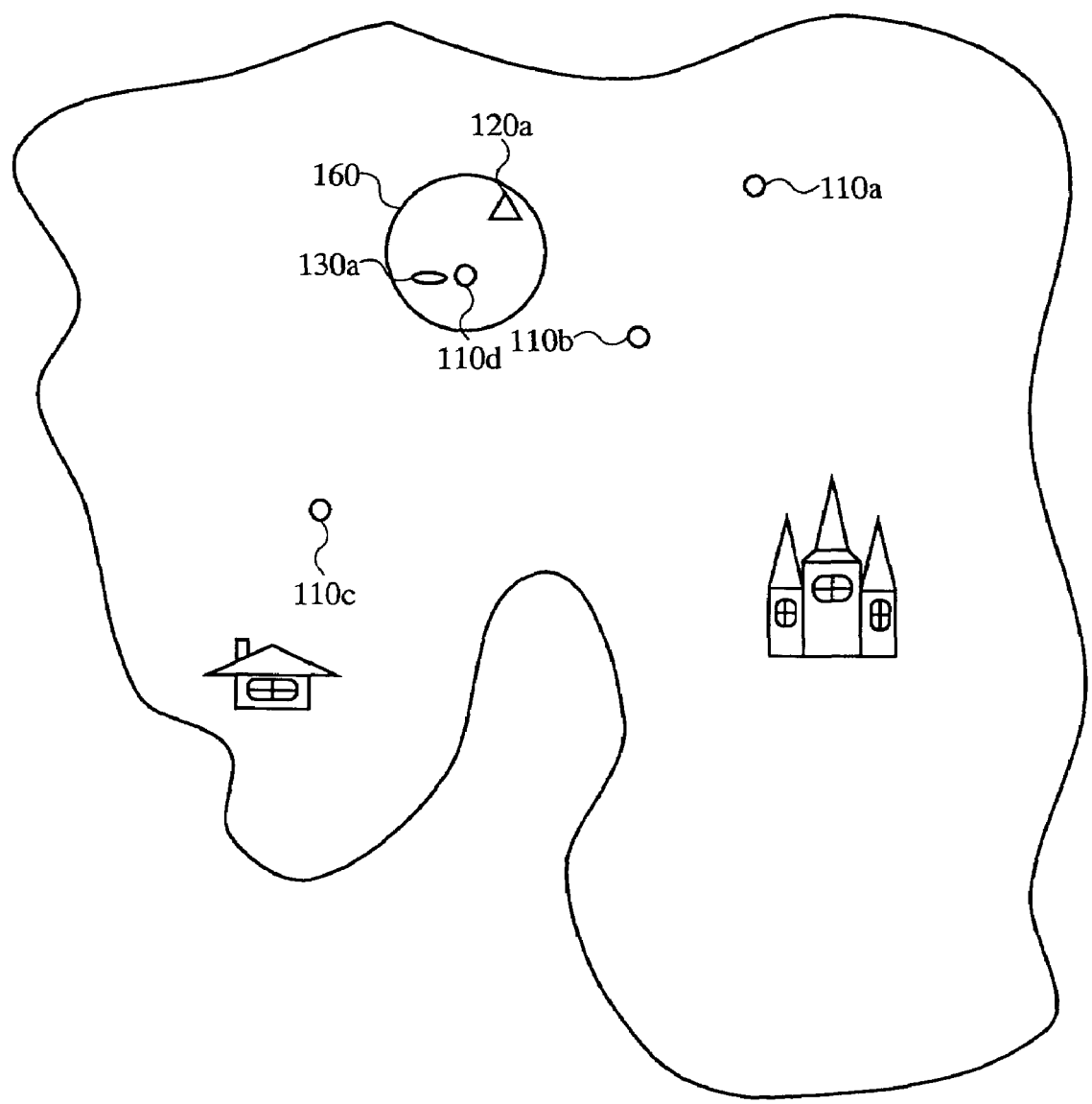
FIG. 13 is an illustration showing a cut-out region 160.
Figure 14:
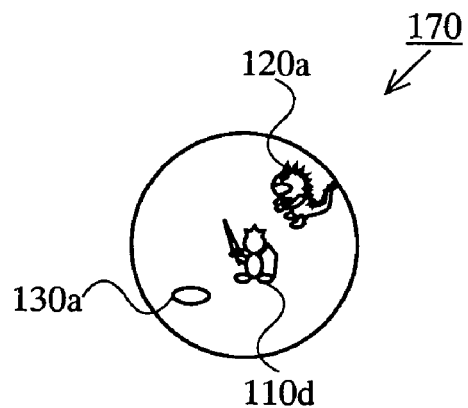
FIG. 14 is an exemplary illustration showing a cut-out image 170 which is cut out at step S21 in FIG. 10.

FIG. 13 is an exemplary illustration showing a cut-out region 160 set in the game space, which is set by cutting out the surrounding region of the player character 110d. The cut-out region 160 corresponds to the surrounding region of the player character 110d, and is determined to have a predetermined size in the game space. FIG. 14 is an illustration showing a cut-out image 170, which was cut out at step S21. The cut-out image 170 is determined such that an image of the surrounding area of the player character 110d, which corresponds to the cut-out region 160, is cut out from the first image.

Figure 15:
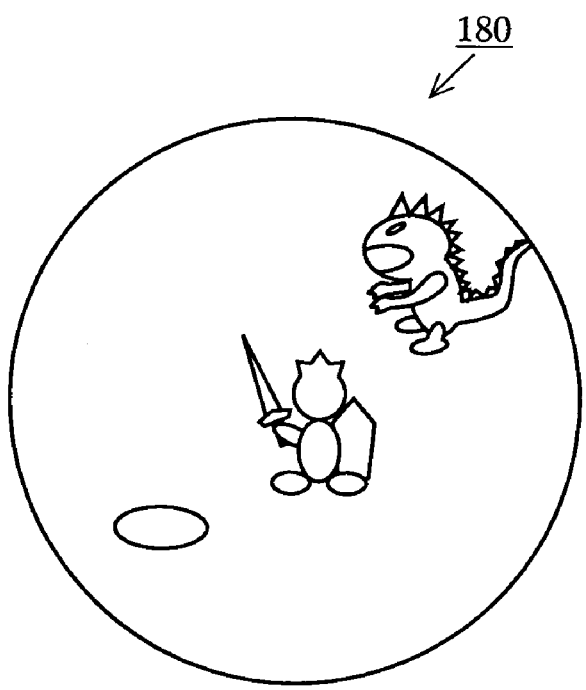
FIG. 15 is an exemplary illustration showing a game image (a second image 180), which has been zoomed in at step S23 in FIG. 10.

Upon completion of step S21, the CPU 31 at step S23 zooms in on the cut-out image 170, which was determined at step S21, and creates a second image. For example, the cut-out image 170 shown in FIG. 14 is zoomed in so as to be displayed in a predetermined size on the TV monitor 2. FIG. 15 is an exemplary illustration showing a second image 180, which was zoomed in at step S23.

Upon completion of step S23, the CPU 31 at step S25 superimposes the second image created at step S23 on the first image created at step S17, and then outputs to the TV monitor 2. For example, in cases where the second image created at step S23 is created by cutting out the image of the surrounding area of the player character 110d, shown in FIG. 14, the CPU 31 superimposes the second image on the first image with the location of the player character 110d in the first image, created at step S17, as the center.

Figure 16:
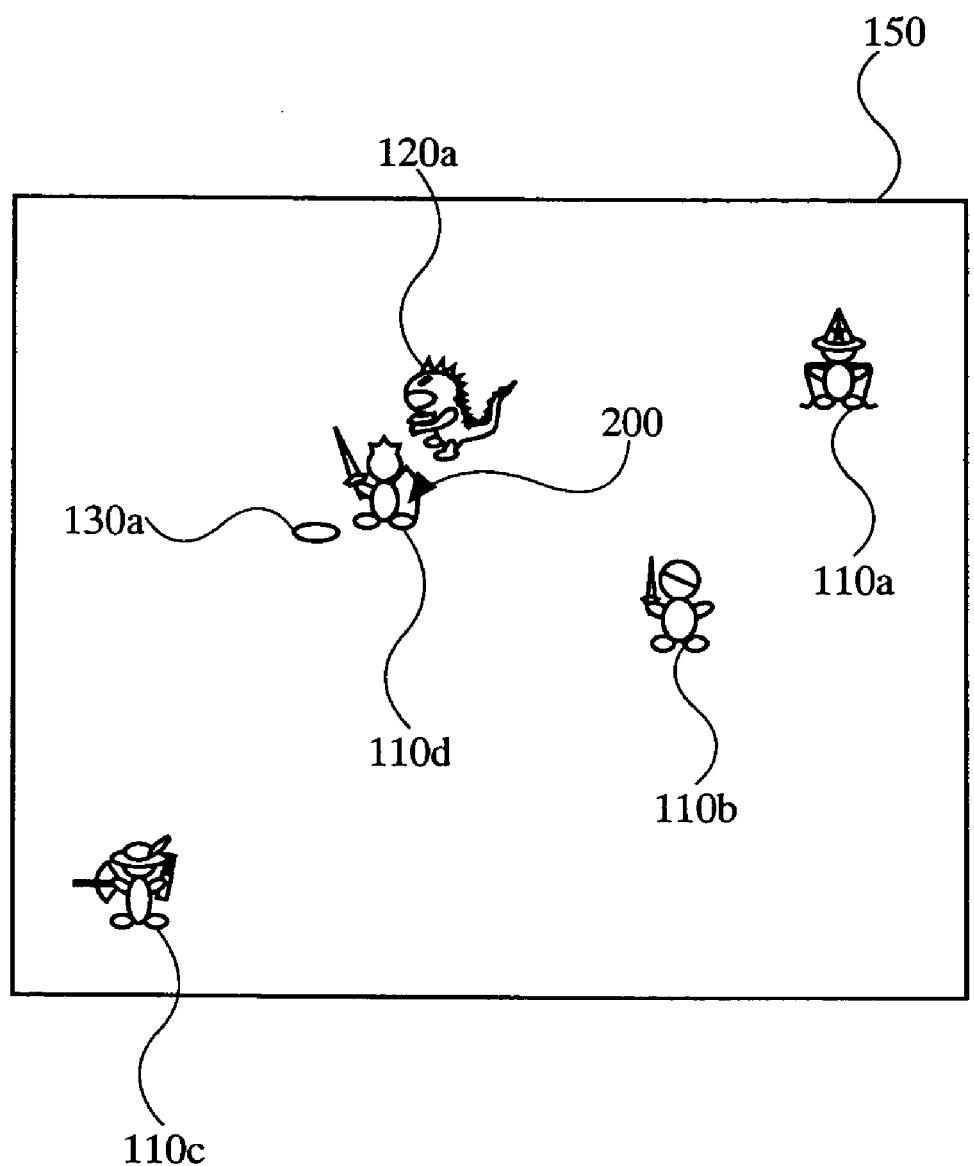
FIG. 16 is an illustration for showing, in the case of superimposing, at step S25 in FIG. 10, the second image created at step S23 on the first image created at step S17, a location 200 at which the second image is superimposed.
Figure 17:
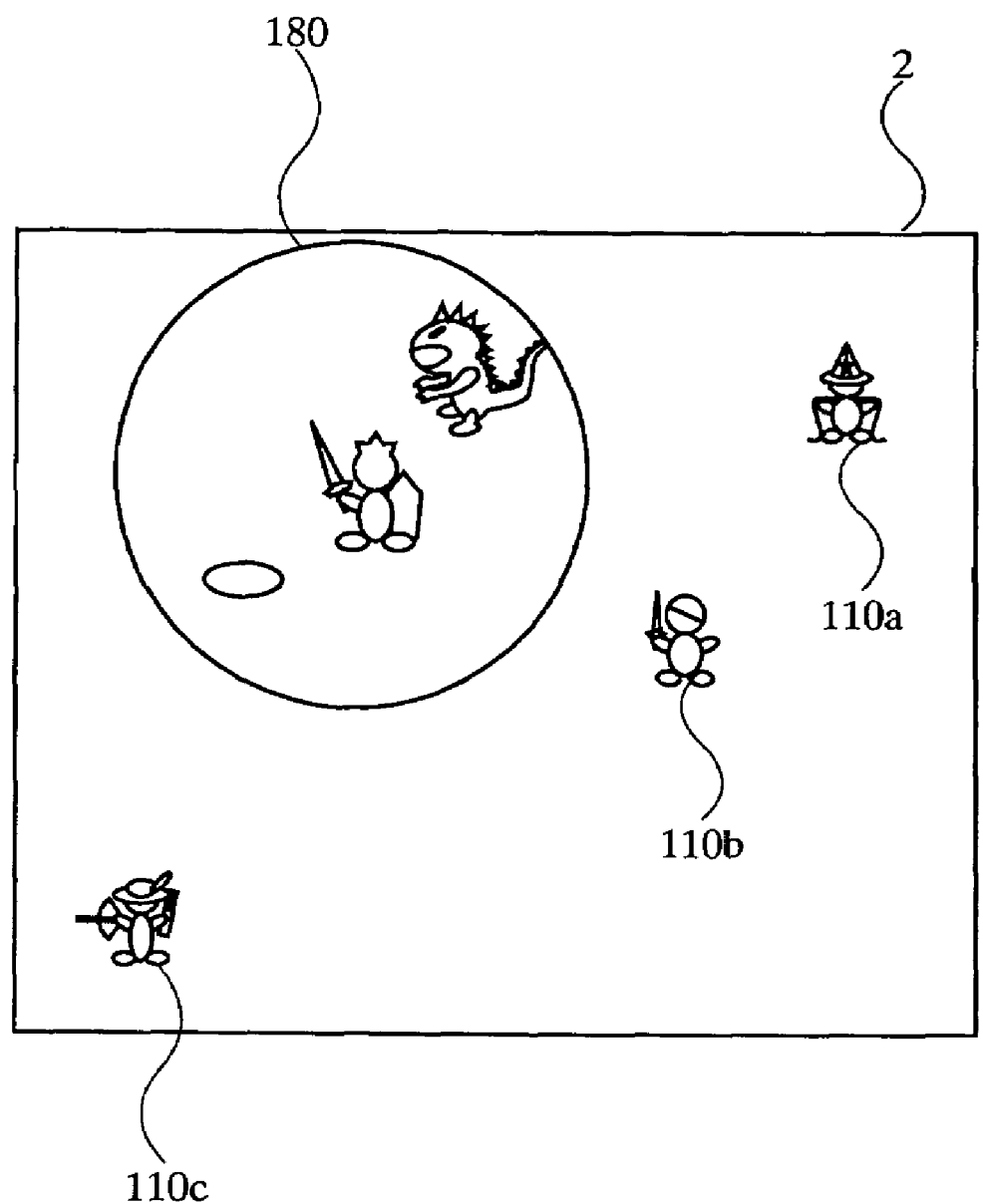
FIG. 17 is an exemplary illustration showing a game image, which is created and output to the TV monitor 2 at step S25 in FIG. 10.

FIGS. 16 and 17 are illustrations for showing a superimposing process at step S25. FIG. 16 shows the first image 150 created at step S17. The second image 180 is superimposed on the first image 150 such that the center of the second image 180, created at step S23 and shown in FIG. 15, is located at the location (a location 200 shown in FIG. 16) of the player character 110d in the first image 150, thereby creating a game image, such as one shown in FIG. 17. Then, the game image, shown in FIG. 17, is displayed on the TV monitor 2.

After the CPU 31 has performed the same processing as above on each of the player characters 110b to 110d, processing advances to step S27. At step S27, the CPU 31 determines whether the game is over or cleared. If the game is either over or cleared, the CPU 31 ends the game processing. If the game is neither over nor cleared, the CPU 31 returns to step S1, shown in FIG. 9, and repeats the processing.

While the invention has been described in detail, the foregoing description is in all aspects illustrative and not restrictive. It is understood that numerous other modifications and variations can be devised without departing from the scope of the invention.

What is claimed is:

1. A game system wherein a plurality of player characters move around in a virtual game space, controlled by a plurality of players, respectively, the game system comprising:

a plurality of operation mechanisms, operated by the plurality of the players, respectively;

a movement controller which controls movement of one of the plurality of player characters in the game space according to a first operation of an operation mechanism;

a first-image generator which generates a first image of a displayed region of the game space which contains all of the player characters;

a second-image generator which generates a second image by zooming in on a surrounding region of a first player character in the game space, when a second operation of an operation mechanism has been performed by one of the players, the first player character being one of the player characters controlled by the one player; and a game image output mechanism which outputs the first image as a game image, when the second operation of an operation mechanism has not been performed by any of the players, and which concurrently superimposes the second image on the first image that contains and displays all of the player characters as an output game image, when the second operation of an operation mechanism has been performed by any one of the players.

2. The game system according to claim 1, wherein the first-image generator generates the first image in a manner such that a size of the displayed region is varied based on a scattering of the player characters moved by the movement controller and an image of the displayed region is zoomed in or out in accordance with the size of the displayed region.

3. The game system according to claim 1, wherein the game image output mechanism superimposes the second image on the first image in accordance with a location of the first player character in the first image.

4. The game system according to claim 1, wherein the surrounding region is a region having the first player character in a center and is a predetermined size region in the game space.

5. The game system according to claim 1, wherein the second image is displayed on a display in a predetermined size, the display displaying a game image output by the game image output mechanism.

6. The game system according to claim 1, wherein the second-image generator generates the second image by cutting out and zooming in on a portion of the first image created by the first-image generator.

7. A storage medium having stored thereon a game program to be executed by a game system, the storage medium being readable by the game system comprising a plurality of operation mechanisms operated by a plurality of players, respectively, wherein a plurality of player characters move around in a virtual game space, controlled by the plurality of players, respectively, wherein:

the game program provides functions to the game system, the functions comprising:

a movement controller which controls movement of one of the plurality player characters in the game space according to a first operation of an operation mechanism;

a first-image generator which generates a first image of a displayed region of the game space which contains all of the player characters;

a second-image generator which generates a second image by zooming in on a surrounding region of a first player character in the game space, when a second operation of an operation mechanism has been performed by one of the players, the first player character being one of the player characters controlled by the one player; and a game image output mechanism which outputs the first image as a game image, when the second operation of an operation mechanism has not been performed by any of the players, and which concurrently superimposes the second image on the first image that contains and displays all of the player characters as an output game image, when the second operation of an operation mechanism has been performed by any one of the players.

8. A method for displaying a game space wherein a plurality of virtual characters, controlled by a plurality of players, respectively, move around in the game space, comprising:

a first image generation step which generates an image of the game space containing all of the plurality of virtual characters, a second image generation step which generates a second image of the game space by zooming in on a surrounding region of a first player character in the game space;

a first image output step which outputs a first image to a display, and a second image output step which outputs a second image to the display, the second image being concurrently superimposed over the first image that contains and displays all player characters.

9. The method of claim 8 wherein the second image output step further comprises:

an operation detecting step which detects an operation input by one of the players, a second image output initiation which initiates the output of the second image to the display upon detection by the operation detecting step that a specified input has been input by one of the players, and wherein the second image output step does not occur unless the second image output initiation step initiates the output of the second image.

10. The method according to claim 9 wherein the second image generation step does not occur unless the operation detecting step detects an operation input by at least one of the players.

* * * * *